(12) United States Patent
Jasinski, II et al.

(10) Patent No.: US 7,300,105 B2
(45) Date of Patent: Nov. 27, 2007

(54) VEHICLE SEAT ASSEMBLY AND STORAGE PANEL

(75) Inventors: Lawrence S Jasinski, II, Clarkston, MI (US); Stephen J Sowinski, Rochester Hills, MI (US); Scott A Endreszl, Walled Lake, MI (US); David L Dyle, Grosse Pointe Woods, MI (US); Sean P Conway, Royal Oak, MI (US)

(73) Assignee: Chrysler LLC, Auburn Hills, MI (US)

( * ) Notice: Subject to any disclaimer, the term of this patent is extended or adjusted under 35 U.S.C. 154(b) by 115 days.

(21) Appl. No.: 11/295,248

(22) Filed: Dec. 6, 2005

(65) Prior Publication Data

US 2007/0126273 A1 Jun. 7, 2007

(51) Int. Cl.
*A47C 7/62* (2006.01)

(52) U.S. Cl. .......................... 297/188.04; 297/188.07; 297/119; 297/125; 297/147

(58) Field of Classification Search ........... 297/188.07, 297/188.05, 188.04, 188.21, 119, 125
See application file for complete search history.

(56) References Cited

U.S. PATENT DOCUMENTS

| | | | | |
|---|---|---|---|---|
| 5,973,917 | A * | 10/1999 | White | 361/683 |
| 6,059,358 | A * | 5/2000 | Demick et al. | 297/188.04 |
| 6,199,948 | B1 * | 3/2001 | Bush et al. | 297/217.3 |
| 6,220,660 | B1 * | 4/2001 | Bedro et al. | 297/188.04 |
| 6,494,533 | B1 * | 12/2002 | Bohler | 297/188.05 |
| 6,702,375 | B1 * | 3/2004 | Laskowski et al. | 297/188.07 |
| 6,874,667 | B2 * | 4/2005 | Dykstra et al. | 224/498 |

* cited by examiner

*Primary Examiner*—David Dunn
*Assistant Examiner*—Erika Garrett
(74) *Attorney, Agent, or Firm*—Ralph E. Smith

(57) ABSTRACT

A passenger seat assembly for a vehicle includes a storage panel assembly. The seat assembly has a seat back foldable between upright and generally horizontal positions relative to a seat bottom. The seat back has a rear surface incorporating the storage panel assembly. The storage panel assembly has a platform and at least one sidewall moveable relative to the platform between a retracted position preferably generally flush with the rear surface of the seat back and an extended position inclined relative to the platform to facilitate receiving and retaining objects on the platform.

2 Claims, 3 Drawing Sheets

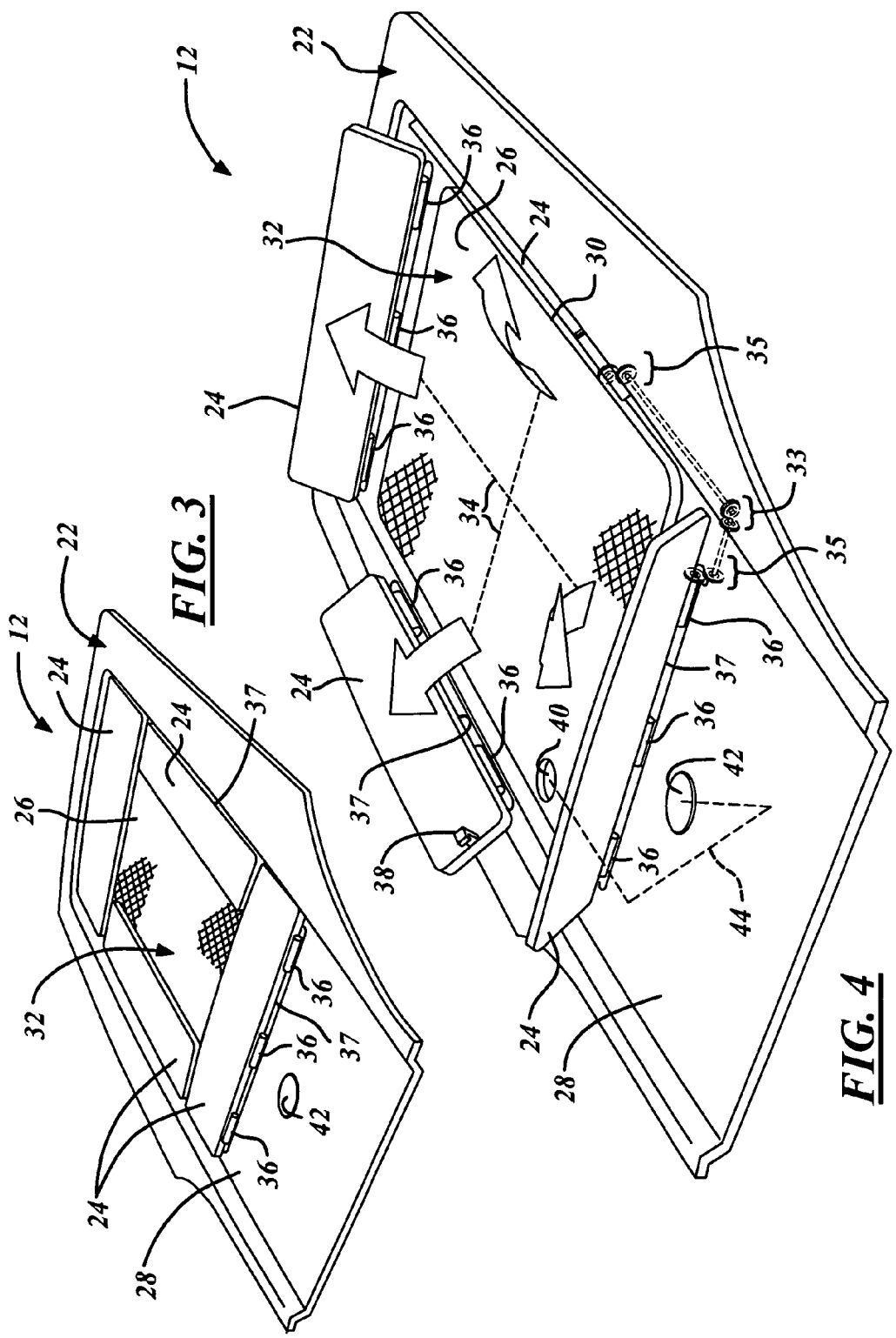

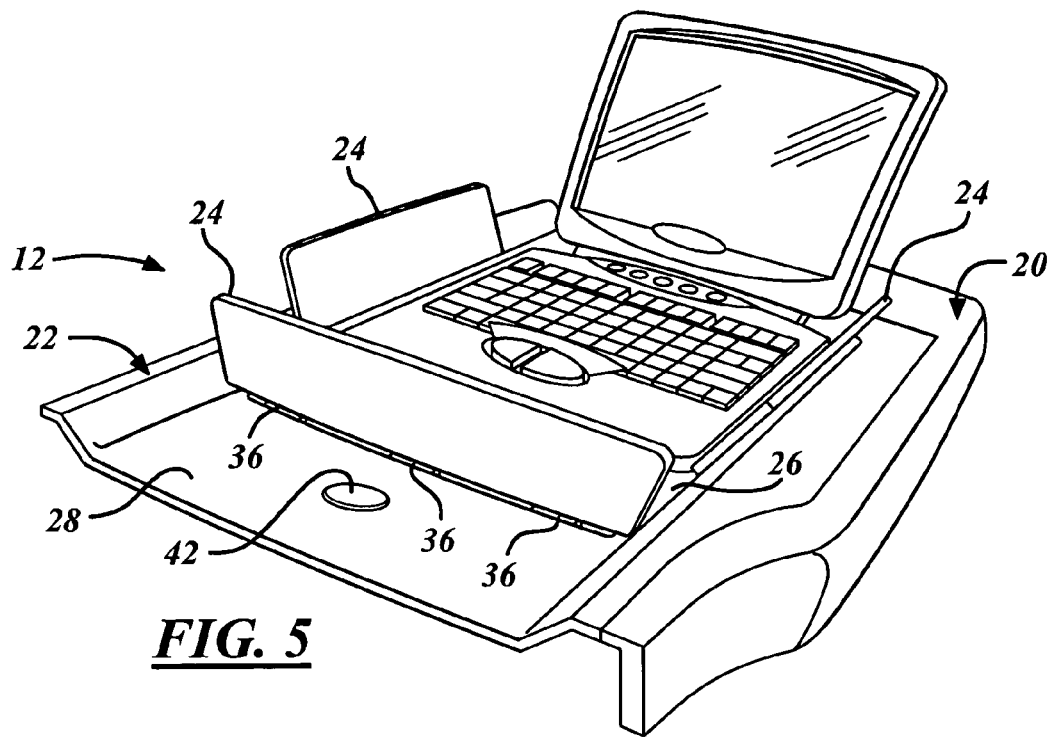
FIG. 5
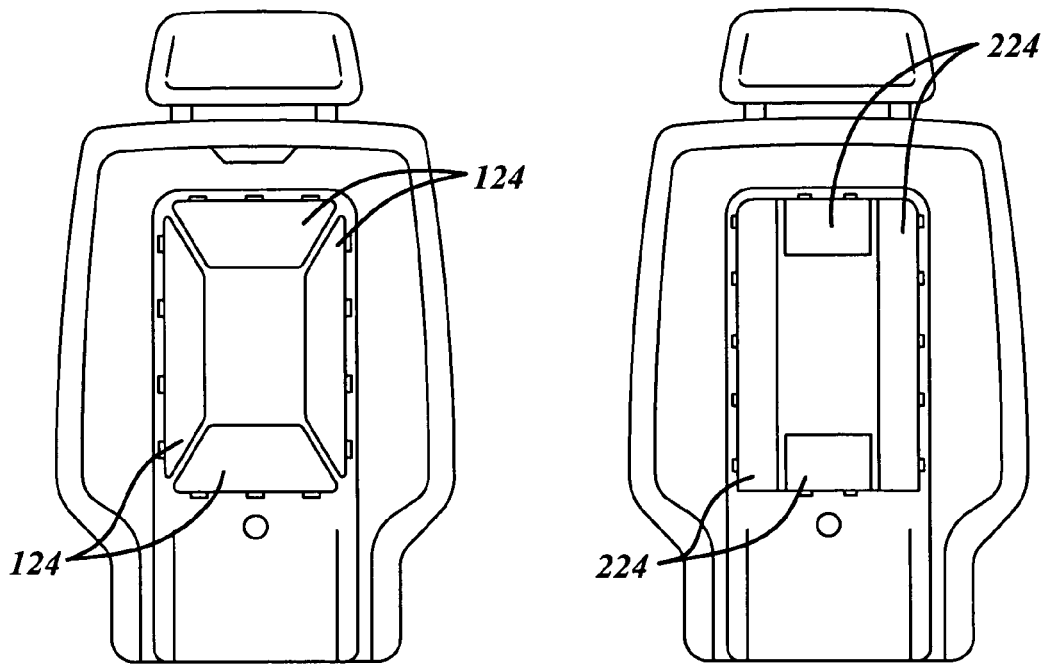
FIG. 6
FIG. 7

VEHICLE SEAT ASSEMBLY AND STORAGE PANEL

FIELD OF THE INVENTION

The invention relates generally to passenger vehicles and more particularly to folding seats for passenger vehicles.

BACKGROUND OF THE INVENTION

Certain passenger vehicles include passenger seats having a seat back that can be folded to a generally horizontal position. Typically, the seat back is formed of a relatively rigid plastic material, or covered with a relatively taut, flat fabric providing a generally flat surface. As such, when the seat back is folded to the horizontal position, objects can be placed on the seat back. Unfortunately, if the vehicle moves or shifts, or if the objects are otherwise caused to move, the objects tend to slide, roll or fall from the seat back. Accordingly, the seats do not provide a very useful area for storing or resting objects when their seat backs are in their horizontal position.

SUMMARY OF THE INVENTION

A passenger seat assembly for a vehicle has a seat bottom and a seat back foldable between upright and generally horizontal positions relative to the seat bottom. The seat back has a forward facing backrest portion for engaging and supporting a passenger's back and a rear surface having a panel portion. The panel portion includes a platform and at least one sidewall moveable between a retracted position preferably generally flush with the rear surface of the seat and an extended position inclined relative to the platform. With the seat back in its horizontal position and the sidewall in its extended position, objects can be stowed and retained on the platform. In one implementation, the platform may include features for storing or retaining particular objects, such as beverage containers, a purse, a laptop computer and the like.

In another implementation, a storage panel assembly is provided for a vehicle passenger seat having a seat bottom and a seat back foldable to a generally horizontal position on top of the seat bottom. The seat back has a forward facing backrest portion for engaging and supporting a passenger's back when in an upright position and a rear surface including the storage panel. The storage panel assembly includes a generally flat platform and at least one sidewall moveable between a retracted position preferably generally flush relative to the rear surface of the seat back and an extended position inclined relative to the platform. With the seat back in its horizontal position and the sidewall in its extended position, objects can be stowed and retained on the platform.

BRIEF DESCRIPTION OF THE DRAWINGS

These and other objects, features and advantages of the present invention will be apparent from the following detailed description of the preferred embodiments and best mode, appended claims and accompanying drawings in which:

FIG. 3 is a partial perspective view of the seat back showing a rear panel portion in a closed flat position;

FIG. 4 is a view similar to FIG. 3 showing the rear panel portion in an open storage position;

FIG. 5 is a perspective view similar to FIG. 4 showing a lap-top computer resting on the rear panel portion;

FIG. 6 is a rear view of the passenger seat having another presently preferred embodiment of a rear panel portion; and FIG. 7 is a rear view of the passenger seat having yet another presently preferred embodiment of a rear panel portion.

DETAILED DESCRIPTION OF PREFERRED EMBODIMENTS

Figure 1:
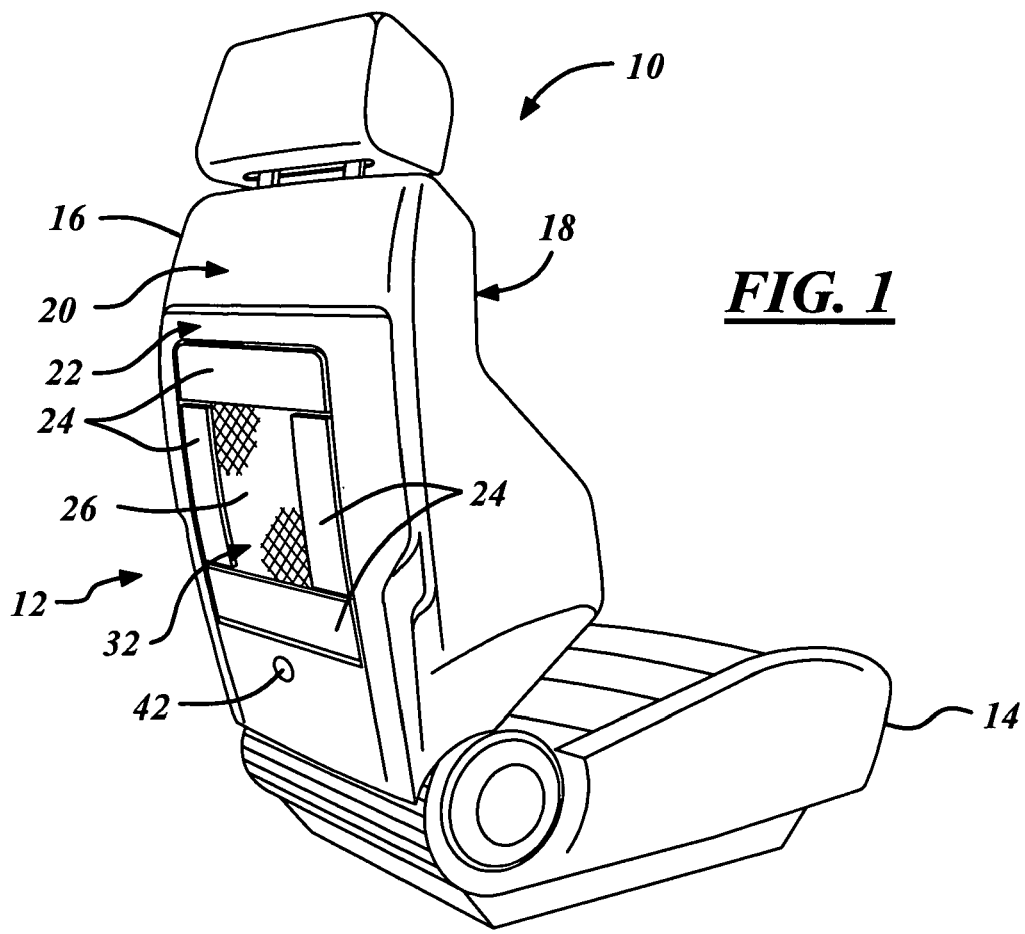
FIG. 1 is a rear perspective view of one presently preferred embodiment of a vehicle passenger seat having a foldable seat back.
Figure 2:
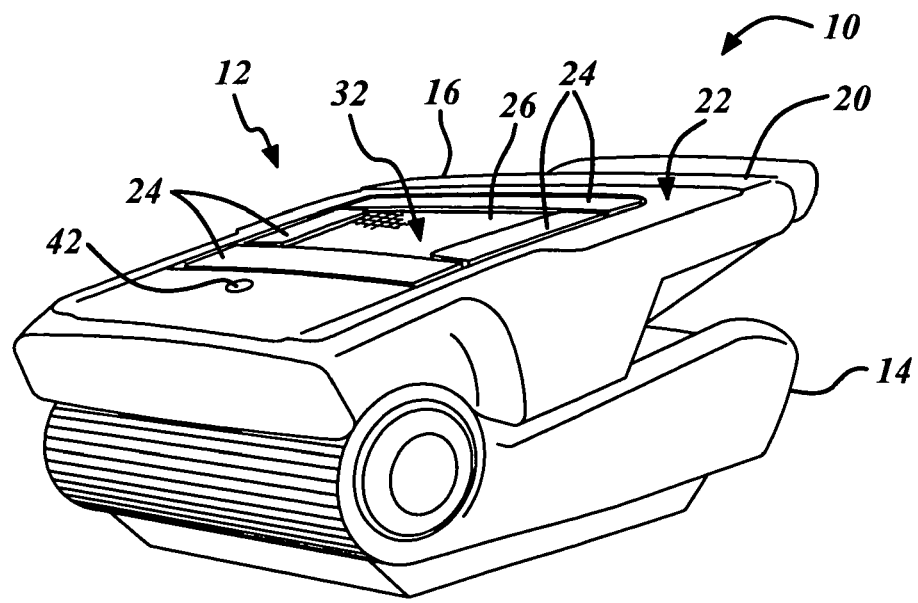
FIG. 2 is a perspective view showing the seat back folded to a generally horizontal position.

Referring in more detail to the drawings, FIGS. 1 and 2 illustrate a passenger seat assembly 10 having a storage panel assembly 12 with a seat bottom 14 and a seat back 16. The seat back 16 can be pivoted or folded relative to the seat bottom 14 between upright (FIG. 1) and generally horizontal positions (FIG. 2). The seat back 16 has a front facing backrest portion 18 for engaging and supporting a passenger's back, and a rear surface 20 opposite the backrest portion 18. The rear surface includes the storage panel assembly 12, which has a panel portion 22 with at least one sidewall, represented here, by way of example and without limitations, as four sidewalls 24, moveable under an applied force between retracted (FIG. 3) and extended positions (FIGS. 4 and 5) relative to a bottom wall or stowage platform 26. While the seat back 16 is in its upright position, the sidewalls 24 desirably remain in their retracted, and preferably generally flush with the rear surface 20. When the seat back 16 is in its generally horizontal position, the sidewalls 24 can be moved to their extended position, wherein they extend outwardly relative to the platform to help stow and retain objects on the platform 26. Accordingly, the platform 26 can be arranged to support a multitude of objects, such as, for example, a laptop computer, as shown in FIG. 5, food and beverages in a variety of container shapes and sizes, purses, and the like.

The seat assembly 10 can be incorporated into any and all passenger locations within the vehicle, including the front seat locations. The panel portion 22 is preferably constructed from a high strength, durable polymeric or metallic material, and may be constructed as one piece or as separate pieces attachable to the rear surface 20 of the seat back 16. The panel portion 22 preferably has a slightly recessed portion 28 (FIGS. 3-5) for at least partial receipt of the sidewalls 24 when in their retracted position. As such, when one or more seat backs 16 are folded to their generally horizontal position, and the sidewalls 24 of the panel portions 22 are retracted, the sidewalls 24 are preferably coplanar and flush with the seat rear surfaces 20 and with one another. As such, objects can be placed or slid on the seat backs 16 while in their generally horizontal positions and over the panel portions 22, thereby allowing the objects to be stowed and/or transported in the vehicle. Otherwise, the sidewalls 24 can be moved to their extended positions (FIGS. 4 and 5) while the seat back 16 is in its folded, generally horizontal position to facilitate stowing objects on the platform 26.

The platform 26 is represented here as having a generally rectangular outer periphery 30 (FIG. 4) sized for receipt in the recessed portion 28 of the panel portion 22. The thickness of the platform 26 is preferably predetermined to provide space to receive the sidewalls 24 when in their retracted position. The platform 26 is preferably constructed from a material having a durable, non-skid outer surface 32, such as from rubber, or rubberized fabric, for example. As such, objects placed on the platform 26 are inhibited from sliding along the outer surface 32 of the platform 26. Although the platform 26 is represented as having a generally continuous flat outer surface 32, it could be constructed having any desired shape and configuration. For example, the platform 26 could be formed with receptacles extending into the seat back 16 for receipt of beverage containers of various shapes and sizes, or with recesses for receipt of other objects, such as pens or cell phones, for example.

The sidewalls 24 of the panel portion 22 preferably remain in their retracted position while the seat back 16 is in its upright position. The sidewalls 24 could be arranged to move independently from one another, though, they are preferably arranged for cooperative movement with one another. A representative mechanical linkage including meshing pinion gears 33 and/or spur gears 35 is shown in FIG. 4. Other linkages may be used, and they may include electronic components. The sidewalls 24 may be interconnected by any suitable linkage 34 so that movement of one sidewall causes movement of each of the other sidewalls. In this manner, the sidewalls move simultaneously.

The sidewalls 24 bound a portion of the platform 26, and are represented here as being attached for pivotal movement outwardly from the platform 26, such as by hinges 36 (FIGS. 3-5) adjacent a base 37 or lower edge of each sidewall 24, for example. The sidewalls 24 can pivot from their retracted position, wherein they are generally flush with the seat back surface 20 to their extended position inclined relative to the seat back surface 20 and platform 26. To facilitate movement of the sidewalls 24 between their retracted and extended positions, the sidewalls 24 are preferably biased toward one of their retracted or extended positions, such as by springs, which can be integrated in the hinges 36, for example. Various types of suitable spring biased hinges can be purchased from the Monroe Hinge and Stamping Company, located in Auburn Hills, Mich., for example. The spring hinges 36 in the implementation shown bias the sidewalls 24 toward their extended inclined position.

To releasably maintain the sidewalls 24 in their retracted position, at least one of the sidewalls 24 can have a locking mechanism, represented here as a finger or latch 38 (FIG. 4), by way of example and without limitations, extending outwardly therefrom. The latch 38 is adapted for releasable locking engagement with a catch or opening 40 in the platform 26. The latch 38 can be moved to release it from the opening 40 via manually pulling on at least one of the sidewalls 24, or via an actuator, represented here as a button 42 within the panel portion 22, by way of example and without limitations. The button 42 is operably associated with the latch 38 preferably via a mechanical, electrical or electromechanical mechanism 44, so that the latch 38 is released from the opening 40 when the button 42 is pushed. When the latch 38 is released from the opening 40, the sidewalls 24 move under the bias of the spring that acts on at least one sidewall 24 to conjointly move the interconnected sidewalls 24 to their extended positions. As such, the platform 26 is exposed for receipt of objects thereon.

In one implementation, the sidewalls 24 can be returned conjointly to their retracted position by manually moving at least one of the sidewalls 24 to its fully retracted position. Upon returning the sidewalls 24 to their retracted position, the latch 38 moves back into locked engagement with the opening 40, thereby maintaining the sidewalls 24 in their retracted position until the latch 38 is released from the opening 40.

The individual sidewalls 24 can take on any variety of shapes and sizes, and preferably are arranged to cooperate with one another while moving between their retracted and extended positions. For example, as shown in FIGS. 1-3, the sidewalls 24, when in their retracted position, are preferably in close, slightly spaced and non-interfering relation with one another. In FIGS. 6 and 7, additional configurations of sidewalls 124, 224, respectively, are shown, wherein the sidewalls 124, 224 have differing shapes. Otherwise, the embodiments shown in FIGS. 6 and 7 function in the same manner as described above. It should be recognized, though, the sidewalls 24, 124, 224 could be sized for partial overlapping engagement with one another (not shown) while in their retracted position. Preferably, even if overlapped, they are able to freely move between their retracted and extended positions freely.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. For example, it should be recognized that the sidewalls can be attached for movement between their retracted and extended positions using other mechanisms than hinges, and that they could be arranged to pivot inwardly into a recessed cavity in the seat back, rather than outwardly from the seat back. The invention is defined by the following claims.

What is claimed is:

1. A seat assembly for a vehicle, comprising:
   a seat bottom; and
   a seat back foldable between upright and generally horizontal positions relative to the seat bottom, the seat back having a forward facing backrest portion for engaging and supporting a passenger's back and a rear surface opposite the backrest portion, the rear surface having a recessed panel portion including a platform having an outer periphery and at least one sidewall bounding a portion of the platform and pivotally attached adjacent the outer periphery with at least one spring biased hinge for movement between a retracted position wherein the at least one sidewall resides within the recess of the panel portion coplanar and flush with the rear surface of the seatback and an outwardly extended position inclined relative to the platform, wherein said at least one spring biased hinge is arranged to bias said at least one sidewall to its outwardly extended position;
   a locking mechanism comprising a latch mounted on said at least one sidewall and a corresponding catch positioned on said platform for releasably locking and maintaining said at least one sidewall in its retracted position; and
   an actuator operably associated with said locking mechanism to unlock and release said at least one sidewall whereby said at least one sidewall is biased to its outwardly extended position to facilitate stowing objects on the platform; further including a plurality of sidewalls in operable communication with one another wherein movement of one sidewall causes conjoint movement of the remaining sidewalls between their retracted and extended positions.

2. The seat assembly of claim 1 wherein the platform has a non-skid outer surface.

* * * * *